United States Patent [19]
Jorn et al.

[11] 3,955,808
[45] May 11, 1976

[54] PRESTRESSED COMPOSITE SPRING ELEMENT

[76] Inventors: Raoul Jorn, Gem. Wasserburg a.B., 8992 Hengnau; Peter Reichardt, Grasiger Rain 4, 7012 Fellbach, both of Germany

[22] Filed: Dec. 13, 1974

[21] Appl. No.: 532,374

[52] U.S. Cl. .............................. 267/152; 267/63 R; 105/136; 105/139; 105/113; 105/132.1
[51] Int. Cl.² .......................................... F16F 3/09
[58] Field of Search ............ 267/63 R, 63 A, 3, 152; 105/136, 139, 113, 132.1; 308/2 R, 2 A

[56] References Cited
UNITED STATES PATENTS

| | | | |
|---|---|---|---|
| 3,045,998 | 7/1962 | Hirst | 267/63 A |
| 3,242,877 | 3/1966 | Hirst et al. | 267/63 R |
| 3,539,170 | 11/1970 | Hamel | 267/63 A |

Primary Examiner—James B. Marbert
Attorney, Agent, or Firm—Karl F. Ross; Herbert Dubno

[57] ABSTRACT

A spring element comprises an insert formed of a rigid metallic core having four outwardly directed faces each bonded to a respective side of a respective elastomeric body whose other side is bonded to a respective metallic plate. The insert so formed is compressed and fits in a throughgoing central passage in a rigid metallic casing with each of the metal plates pressing against a respective inwardly directed face of the casing. The insert is symmetrical about a vertical plane and the angle between the upper two bodies can be larger than the angle between the lower two bodies. In addition the metal plates of the upper two bodies may be integrally formed of a single metal strip also constituting a part of the casing and the lower bodies carry metal plates which lie within a seat which can be formed in a motor-vehicle frame element for a very compact assembly.

9 Claims, 13 Drawing Figures

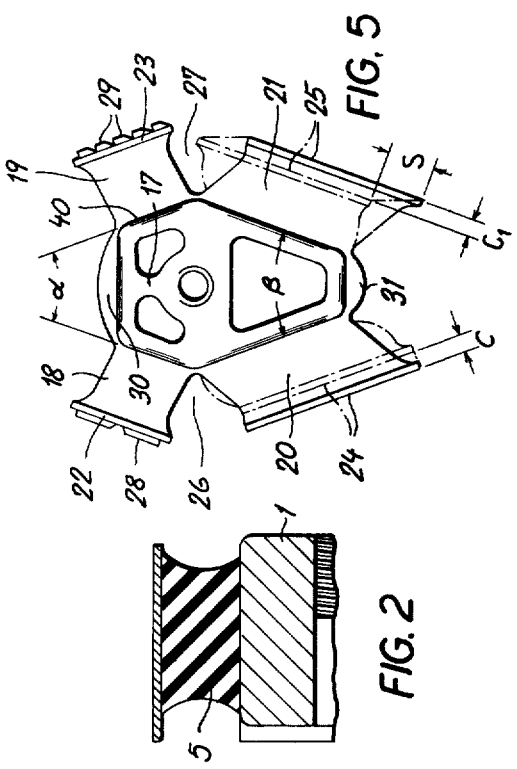

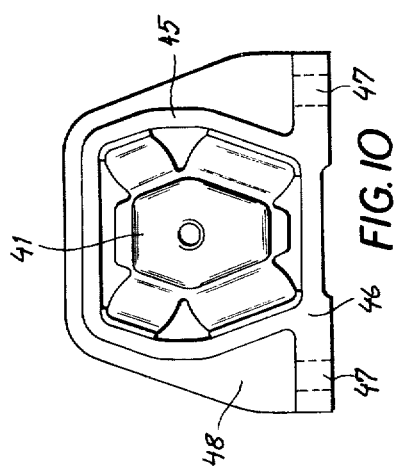
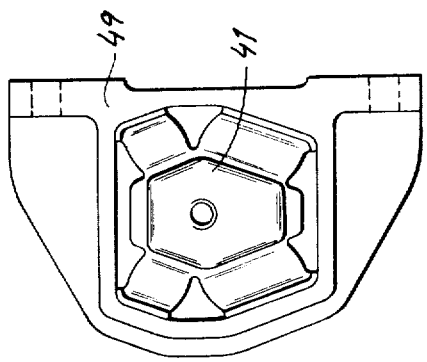
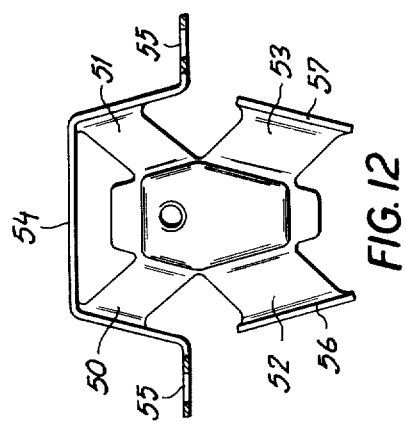
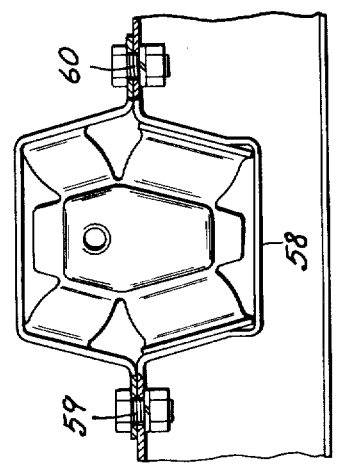
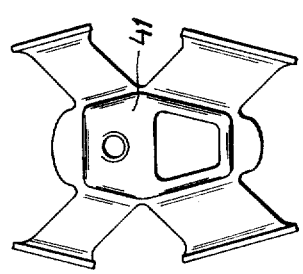
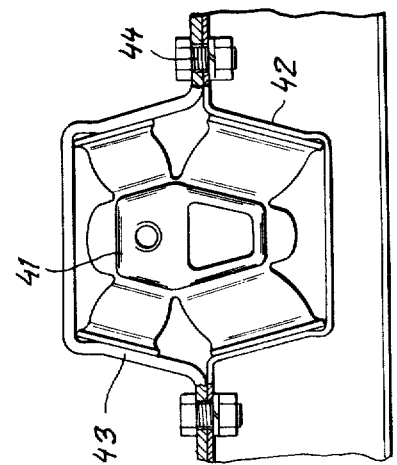

PRESTRESSED COMPOSITE SPRING ELEMENT

CROSS-REFERENCE TO RELATED APPLICATION

The present application is related to my copending patent application Ser. No. 482,631 filed on June 24, 1974. (now U.S. Pat. No. 3,873,077), itself citing my earlier U.S. Pat. No. 3,730,509.

FIELD OF THE INVENTION

My present invention relates to a composite spring element. More particularly this invention concerns such a spring element usable in a motor vehicle as an engine mount.

BACKGROUND OF THE INVENTION

A wedge-shaped motor mount is known having two symmetrically arranged elastomeric bodies which are vertically stressed both in shear and pressure and are bonded between inner and outer metal parts. Depending on the angle of inclination of the wedges it is possible to produce different spring constants. Simultaneous existence of both shear and compressive forces avoids bending stresses and gives very good force distribution in the spring element. However if lifting forces are applied to such a spring element the elastomeric material is tensioned and quickly either detaches itself from the metal elements to which it is bonded or rips. It is known to avoid this difficulty by providing such plates which are stressed by pressure. However when such an arrangement is used the vibration- and noise-damping characteristics of the spring are substantially impaired. Thus such wedge-shaped mounts cannot be used wherever lifting forces might be encountered.

It has also been suggested to arrange two such wedge-shaped mounts asymmetrically and if necessary to also prestress them against eachother. Such arrangements however almost completely eliminate the noise-damping characteristics of the spring and creates a bulky assembly. In addition the mounting of such devices and the determination of just the right materials for the desired spring constant becomes very difficult.

In modern motor vehicles the engine is of substantially greater power output per unit of weight than ever. Thus the vertical stresses to which an engine mount are subjected remain the same while the reaction forces caused by the engine torque have grown considerably. These reaction forces are determinative of the service life of elastic motor mounts. It is impossible to use in modern automotive vehicles having such high-power engine conventional motor mounts especially when the transmission is bolted directly to the vehicle engine as with front-wheel drive or a rear-mounted engine. Such mounts are also inadequate for separately mounted transmissions in which the reaction forces are equal to the difference between the input and output forces.

OBJECTS OF THE INVENTION

It is therefore an object of the present invention to provide an improved spring element.

Yet another object of this invention is the provision of a composite spring element usable in a motor vehicle as an engine mount.

Yet another object is the provision of such an engine mount which can be used to absorb both upward and downward forces and which comprises a single compact unit which can readily be mounted in the motor vehicle.

Yet another object is the provision of an engine mount which can be secured directly to the support elements of the engine and the motor-vehicle frame.

SUMMARY OF THE INVENTION

These objects are attained according to the present invention in a spring element comprising a rigid metallic core having four outwardly directed faces and received in a throughgoing central bore passing through a rigid metallic casing. This bore is formed with four inwardly directed faces each spaced from and aligned with a respective face of the core. Four substantially separate and highly precompressed elastomeric bodies each having one side bonded to a respective face of the core and an opposite side carrying and bonded to a respective metal plate are received between the core and the casing with the metallic plate pressing against (and thus frictionally engaging) the corresponding face of the casing.

The spring element according to the invention can therefore readily be manufactured as two separate pieces: the outer frame or casing and an insert formed of the inner plates, the core, and the elastomeric bodies. Thus the elastomeric bodies are vulcanized on their plates and the core in a single operation and thereafter compressed and fit into a hole through the casing. It is therefore possible to provide casings with identical outer dimensions but different sized holes so as differently to prestress the insert fitted therein and thereby to obtain different spring characteristics. Such an arrangement can be stressed also in both in the up and down directions with no damage to the assembly when the passage through the casing is generally horizontal and the casing is therefore vertical. Thus when the core is urged upward relative to the casing the upper elastomeric bodies are compressed and the lower elastomeric bodies are relieved. Under normal circumstances the precompression of these elastomeric bodies is such that all of the bodies remain in contact with their respective inner faces of the casings at all times. When, however, an excessive force is exerted in one direction so as greatly to compress one or two of the elastomeric bodies the opposite body or bodies can pull away from the casing without any damage to the assembly, as would be the case were these elements bonded to the inside of the casing.

In accordance with a further feature of this invention the elastomeric bodies are deformed on pressing into the casing in one or two axial directions in the plane of the composite spring element. Depending on the shape of the casing the elastomeric bodies can be prestressed only by pressure or by a combination of pressure and shear. Thus, for example, the elastomeric bodies are only stressed by pressure when the inside vertical width of the frame corresponds to the vertical height of the unstressed insert, whereas the inside horizontal width of the frame is smaller than the horizontal width of the unstressed insert. If on the contrary the inside width of the frame is smaller in vertical and horizontal directions then the width and height of the unprecompressed insert, when inserted the elastomeric bodies will be stressed both in pressure and shear. In the last case the spring characteristic is steeper in the vertical direction, that is in the direction of the major forces.

According to another feature of this invention the outer surfaces of the planar metal plates completely covering the outer sides of the elastomeric bodies are provided with thin film-like elastomeric layers which may be formed with longitudinal or transverse elastomeric ribs of sinusoidal, zig-zag, or sawtooth section. Such an elastomeric layer increases the coefficient of friction between the outside of the plate and the inside of the frame and almost completely eliminates the possibility of displacement of the insert relative to the frame. Transverse elastomeric ribs are provided when a relative shift between the two parts in the vertical direction is to be prevented whereas a longitudinal elastomeric ribs are provided to prevent a lateral pushing-out of the insert.

According to yet another feature of this invention the insert is symmetrical about a vertical plane with two elastomeric bodies to either side of the plane. The angle formed between the upper two bodies is substantially greater than that formed between the outer faces of the lower two bodies. In this manner the upper elastomeric bodies have a much harder spring characteristic so as to limit upward vertical displacement of the motor mounted on this spring as much as possible. Such upward displacement is frequently very damaging to the various fuel connections and control rod connections on the engine.

In accordance with a further feature of this invention the outer casing of the composite spring element is secured to the web of a C-section motor-vehicle frame element between the flanges thereof so that the entire composite spring element is mounted within the outline of this frame element and therefore takes up very little space. In addition such mounting of the spring element protects it from potentially damaging fuel or lubricant which might drip from the engine.

According to yet another feature of this invention the casing can be constituted at least partially of a seat formed directly in the motor-vehicle frame. Thus an upwardly open seat formed in the motor-vehicle frame serves as support surfaces for two of the elastomeric bodies whereas the other two bodies are in contact with a U-shaped element that is bolted to this frame. It is also within the scope of this invention to form the U-shaped element as the plates on these two upper elastomeric bodies so that the spring element is mounted in the motor vehicle simply by bolting the U-element over the seat, with plates for the upper bodies being constituted by the U-shaped element.

BRIEF DESCRIPTION OF THE DRAWING

The above and other objects, features, and advantages will become more readily apparent from the following description, reference being made to the accompanying drawing in which:

FIG. 1 is a side elevational view of a spring insert according to this invention;

FIG. 2 is a section taken along line II—II of FIG. 1;

FIG. 3 shows a composite spring element with the insert of FIGS. 1 and 2;

FIG. 4 is a section taken along line IV—IV of FIG. 3;

FIG. 5 is a side elevational view of yet another spring insert in accordance with this invention;

FIG. 6 is a side elevational view showing the entire composite spring element with the insert of FIG. 5;

FIG. 7 is a section taken along line VII—VII of FIG. 6;

FIG. 8 is a side elevational view of yet another spring-element insert in accordance with this invention;

FIG. 9 is a side elevational view of a composite spring element using the insert of FIG. 8;

FIGS. 10 and 11 are side elevational views of further spring elements in accordance with the present invention;

FIG. 12 is a side elevational view of another spring element in accordance with this invention; and FIG. 13 shows the element of FIG. 12 mounted in a motor-vehicle frame.

SPECIFIC DESCRIPTION

As is shown in FIG. 1 an insert 12 is formed of a central metal part 1 of square shape and formed with weight-reducing cutouts 2 and a central threaded bore 3. Bonded to the outer faces or facets of the prismatic metal body 1 are butyl-compound elastomeric bodies 4, 5, 6, and 7 having outer faces bonded to and carrying flat steel plates 8, 9, 10, and 11. The insert 12 so formed is adapted to be received within an annular casing 13 (FIG. 3) having surfaces 14 against which lie the plates 8–11 and formed with a flange 15 in turn formed with bores 16 allowing this casing 13 to be bolted to a motor-vehicle frame. When the insert 12 is pressed in the casing 13 the bodies 4–8 are compressed as is indicated by a comparison of FIGS. 2 and 4.

FIG. 5 shows an insert having a core 17 whose upper outer flat surfaces 40 form an angle $\alpha$ which is considerably greater than the angle $\beta$ formed by its lower surfaces 40. Bonded to these surface are elastomeric bodies 18, 19, 20, and 21 carrying respective plates 22, 23, 24, and 25. The bodies 18 and 20 are separated by its space 26 and the bodies 19 and 21 by a space 27.

The plate 22 carries a pair of elastomeric rectangular-section strips 28 and the plate 23 carries a plurality of such strips 29 of a sawtooth cross-section. Strips 28 and 29 extend horizontally. The bodies 18–21 can be stressed both compressively and in shear. FIG. 5 shows how the body 20 is stressed only compressively by pressing the plate 24 inwardly by a distance $c$. On the contrary body 21 is compressed inwardly by a distance $c_1$ and sideways by a distance $s$ so that this body is stressed both compressively and in a shear. As shown in FIG. 6 all of the bodies 18–21 are so stressed and the insert is fitted within a casing 32 mounted via its bolt holes 33 on the web 34 between a pair of flanges 35 and 36 of a C-section frame element. A bolt 38 secures an engine lug 39 to the core element 17. Bumpers 30 and 31 are provided on the top and bottom of the element 17 so as to prevent this element from striking directly against the casing 32 and a similar bumper 37 is provided on the end face thereof so as to prevent it from bumping against the web 34.

In FIG. 8 insert 41 is shown which is secured within a casing formed by a U-shaped element 43 secured via bolts 44 to a frame element formed with a seat 42 constituting the other half of the casing.

It is also possible to fit the insert 41 within casing 45 formed with a flange 46 having bolt holes 47 and stiffening ribs 48 and adapted to be secured in the position indicated in FIG. 10 to the top of a frame element. FIG. 11 shows how a similar casing 49 which allows the insert 41 to be secured to the side of the frame element.

The arrangement shown in FIG. 12 has a pair of the upper elastomeric bodies 50 and 51 bonded directly to a U-shaped member having flange feet 55. In addition lower elastomeric bodies 52 and 53 are bonded to respective flat plates 56 and 57 which fit within a seat 58 in a motor-vehicle frame member shown in FIG. 13. Bolts 59 and 60 passing through the seat 55 secure the element 34 to the frame.

In all of the embodiments the insert is symmetrical about a vertical plane and is adapted principally to absorb vertically directed forces.

We claim:

1. A spring element for suspending an engine in an automotive vehicle, said spring element comprising:
    a rigid metallic core having four outwardly directed faces;
    a rigid metallic casing having a peripherally closed throughgoing central passage receiving said core and formed with four inwardly directed faces each spaced from and aligned with a respective face of said core; and
    four substantially separate precompressed elastomeric bodies each having one side bonded to a respective face of said core and an opposite side carrying and bonded to a respective metallic plate pressing against and only frictionally engaging the corresponding face of said casing, said core, said bodies, and said plates constituting an integral insert which is symmetrical about a vertical plane and said passage extending generally horizontally such that said core has a pair of lower faces, the compression of said bodies being maintained in all relative positions of said casing and said core.

2. The element defined in claim 1 wherein said upper faces define an angle that is greater than the angle defined between said lower faces.

3. The element defined in claim 1 wherein at least said plates on said upper faces are provided with strips of elastomeric material pressing against the corresponding faces of said casing.

4. The element defined in claim 3 wherein said strips extend horizontally.

5. The element defined in claim 4 wherein said strips are of sawtooth cross section.

6. The element defined in claim 1, further comprising a frame member formed with a seat constituting the lower half of said casing receiving said lower bodies, a U-shaped metal strip bonded to said upper bodies and constituting the plates on said upper bodies and the upper half of said casing, and means for securing said metal strip to said frame member.

7. The element defined in claim 1 wherein said lower bodies at least are prestressed in shear.

8. The element defined in claim 1, further comprising a bumper of elastomeric material between said upper pair of bodies and another bumper of elastomeric material between said lower pair of bodies.

9. The element defined in claim 1 wherein said bodies are made of a butyl compound.

* * * * *